Patented Apr. 12, 1949

2,467,053

UNITED STATES PATENT OFFICE

2,467,053

CREAMING OF RUBBER LATICES

John S. Rumbold, Woodbridge, Conn., assignor to United States Rubber Company, New York, N. Y., a corporation of New Jersey No Drawing. Application February 19, 1947, Serial No. 729,673

9 Claims. (Cl. 260—82.2)

This invention relates to the creaming of rubber latices, and more particularly to the creaming of rubber latices without the addition of conventional creaming agents, such as vegetable mucilages.

Natural rubber latices and synthetic rubber latices may be creamed, i. e. separated into a rubber-rich cream portion and a serum portion poor in rubber, by the addition thereto of a vegetable mucilage, such as an alginate, locust bean gum, Irish moss, and the like (Traube U. S. Patent 1,754,842; Mueller, India Rubber World, vol. 107, pp. 33–35, 41). There are certain disadvantages when this method is used. Vegetable mucilages are subject to considerable price fluctuation and they are usually expensive, a consideration which becomes especially important when it is desired to purify latex by creaming from a low solids content. An undesirable phenomenon which is encountered when creamed latex is shipped long distances or is left undisturbed for more than a few days, is continued separation of cream and serum portions, or after-creaming. From a commercial point of view the only successful way of retarding after-creaming is to add less than the optimum amount of creaming agent for maximum solids content and extend the creaming period as long as possible. This procedure involves reduced output and lower recovery of latex solids in the form of cream, with a corresponding increase in cost. There is a further disadvantage in the case of synthetic rubber latices. A large proportion of the cost of production of natural latex is expended in protecting it against bacterial decomposition. One of the few advantages of synthetic latex over the natural product is the absence from synthetic latex of fermentable organic materials such as sugars and proteins; but after a mucilagenous creaming agent has been added to synthetic latex this advantage is lost, for dilute solutions of vegetable mucilages provide good media for the growth of certain kinds of bacteria. In the process of the present invention, these disadvantages are largely avoided.

In carrying out the present invention, there is incorporated in the latex one or a mixture of salts of weak organic acid (e. g. carbonic acid, formic acid, acetic acid, propionic acid or butyric acid), and ammonia or a substituted ammonia (amine) in amount such that the equivalent weak acid content is 1 to 10% by weight based on the latex solids, and there is also incorporated in the latex one or a mixture of water-soluble soaps (viz. alkali-metal, ammonium, or substituted ammonium (amine) soaps, generically called "alkali soaps") of a fatty acid having 8 to 14 carbon atoms in the molecule, or abietic acid, or a mixture of such soap-forming acids in amount such that the equivalent soap-forming acid content is 0.25 to 5% by weight based on the latex solids. The pH of the latex should be at least 8, and may be as high as 11. A pH between 9 and 10 is preferred. The salt may be added to the latex as such, or formed in situ. If the latex is a synthetic rubber latex of small particle size having an average particle diameter of 0.07 to 1.2 (about 0.1) micron as in present day commercial synthetic rubber latices, it is preferable to incorporate the salt by first adding the weak acid and then neutralizing it by the addition of the ammonia or amine; or by adding the acid partly neutralized with the ammonia or amine and then adding more ammonia or amine to complete the neutralization of the acid. In this way, the particle size of the latex is increased, generally to about 0.2 to 0.3 micron, by the reduction and increase of the pH, which facilitates the creaming. If desired, a small amount of conventional acid-stable dispersing agent may be added to the latex before reduction of the pH of the latex by the addition of the weak acid as a precaution against coagulation of some of the polymer. The presence of the ammonium or amine salt of the weak acid, and the water-soluble soap, imparts to the latex the colloidal phenomenon of dilatancy wherein the viscosity of the latex increases under pressure or shearing force, as when the latex is stirred or shaken, and wherein the viscosity becomes lower when the force is reduced or removed. The marked thickening produced by rapid stirring of such a latex gives the impression that the latex is about to gel or coagulate, but it is stable and immediately reverts to a thin liquid when the speed of the stirrer is decreased. Such a latex, on addition of water if necessary to adjust the concentration of solids to about 40% or less, preferably to between 10 and 30%, will readily cream on standing.

A description of the phenomenon of dilatancy in wet sand was published by Osborne Reynolds in the Philosophical Magazine of 1885, volume 20, page 469, and in Nature, 1886, volume 33, page 429. If wet fine sand on a beach during ebbtide is trod upon it becomes dry and hard, but when the pressure is released it immediately regains its fluidity. The pressure probably produces reversible agglomerates which are distributed less compactly than the sand grains in their original state and small cavities filled with sea water are formed. The increase of viscosity is accompanied by an increase in volume and hence Reynolds called it dilatancy. The appearance of dilatancy in a latex treated according to the present invention is an indication that the latex will separate on standing into a rubber-rich cream portion and a serum portion poor in rubber. The cream portion will be the supernatant layer if the rubber portion is lighter than water (e. g. natural rubber, copolymers of butadiene-1,3 and styrene or acrylonitrile), and will be the subnatant layer if the rubber is heavier than water (e. g. polychloroprene). The serum may be quite thick and show well-marked dilatancy, while the layer of cream shows no dilatancy, and will not after-cream. Creams of around 50 to 60% solids prepared by the process of the present invention, generally are less viscous than the original latex from which they were prepared. It is possible to make a cream of about 70% solids by the present invention which has only a slightly higher viscosity than the original latex from which it was prepared and which is fluid and has a viscosity comparable to that of a 55 to 60% solids latex produced by known concentrating procedures. By way of comparison, a cream of 67 to 70% solids content produced by known concentration methods is a thick non-flowing paste.

The ammonium or substituted ammonium salt of the weak organic acid which is incorporated in the latex may be the salt of carbonic, formic, acetic, propionic or butyric acid and ammonia or a substituted ammonia, such as a volatile amine, i. e. an amine having a boiling point below 160° C., or an ethanolamine, such as monoethanolamine, diethanolamine or triethanolamine. Examples of such volatile amines are methylamine, ethylamine, dimethylamine, diethylamine, trimethylamine, triethylamine, propylamine, dipropylamine, isopropylamine, di-isopropylamine, butyl primary amines, amyl primary amines, hexyl primary amines, cyclohexylamine, piperidine, 1-methylpiperidine, 2-pipecoline, 3-pipecoline, 4-pipecoline, and such mixed amines as methyl ethylamine, methylpropylamine, methyl butylamine, and methyl diethylamine. Ammonium and volatile amine salts of carbonic, formic and acetic acids are preferred. The added water-soluble soap may be a salt of a fatty acid having 8 to 14 carbon atoms in the molecule or abietic acid, and alkali-metal, ammonia or amine. The alkali-metals, ammonia and amines are generically referred to herein as "alkalis," which term is used in its accepted sense as exclusive of the alkaline-earths. Examples of such fatty acids are caprylic, pelargonic, capric, undecylenic, lauric and myristic acids. Soaps prepared from higher fatty acids such as palmitic, oleic and stearic acids have been found to be ineffective in the present invention. The abietic acid may be in any form, such as crude wood rosin, purified rosin, hydrogenated abietic acid or heat rearranged abietic acid such as disproportionated abietic acid which is formed by heating abietic acid and a catalyst in known manner whereby so-called disproportionation takes place and two fractions are formed, one having a higher degree of saturation and one a lower degree of saturation than the original abietic acid. The amine base of the soap may be a volatile amine or an ethanolamine, as described above for the salt of the carbonic, formic, or acetic acid, etc. As a result of the preservation or stabilization of natural latex and the addition of emulsifying agents to the monomer emulsion in the preparation of synthetic rubber latices, there may well be contained in the latex to be treated according to the present invention sufficient protective to prevent destabilization of the latex on the incorporation therein of the salt of the weak acid and the soap. If additional stabilizer is added, it may be a conventional surface-active agent, not generally in excess of 1% by weight based on the solids of the latex. Such surface-active agent may be a compound of the formula R—SO₃—M, where M is an alkali-metal or ammonia and R is an organic radical that contains at least one group having more than eight carbon atoms. Examples of such compounds are alkyl sulfates (e. g. sodium dodecyl sulfate, sodium cetyl sulfate); alkyl sulfonates (e. g. dodecyl sodium sulfonate, cetyl sodium sulfonate); sulfonated ethers of long and short chain aliphatic groups (e. g.

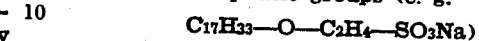

sulfated ethers of long and short chain aliphatic groups (e. g. C₁₇H₃₃—O—C₂H₄—O—SO₃Na); sulfonated alkyl esters of long chain fatty acids (e. g.

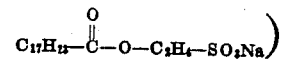

sulfonated glycol esters of long chain fatty acids (e. g.

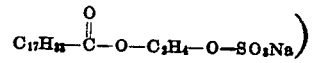

sulfonated alkyl substituted amides of long chain fatty acids (e. g.

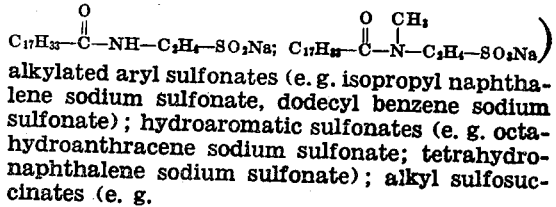

alkylated aryl sulfonates (e. g. isopropyl naphthalene sodium sulfonate, dodecyl benzene sodium sulfonate); hydroaromatic sulfonates (e. g. octahydroanthracene sodium sulfonate; tetrahydronaphthalene sodium sulfonate); alkyl sulfosuccinates (e. g.

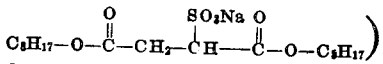

The surface-active agent may be a reaction product of ethylene oxide or polyethylene glycol with a long chain fatty alcohol (e. g. oleyl alcohol), or with an alkylated phenol (e. g. isopropyl phenol), or with a long chain fatty acid (e. g. lauric acid).

The rubber latex that may be creamed according to the present invention may be a natural rubber latex or a synthetic-rubber latex. The synthetic rubber latex may be an aqueous emulsion polymerizate of one or a mixture of butadienes-1,3, for example, butadiene-1,3, methyl-2-butadiene-1,3 (isoprene), chloro-2-butadiene-1,3 (chloroprene), piperylene, 2,3-dimethyl butadiene-1,3. The synthetic rubber latex may be an aqueous emulsion polymerizate of one or more of such butadiene-1,3 with one or more other polymerizable compounds which are capable of forming rubbery copolymers with butadienes-1,3, for example, up to 70% of such mixture of one or more compounds which contains a CH₂=C< group where at least one of the disconnected valences is attached to an electroactive group, that is, a group which substantially increases the electrical dissymmetry or polar character of the molecule. Examples of compounds which contain a CH₂=C< group and are copolymerizable with butadienes-1,3 are aryl olefins, such as styrene, and vinyl naphthalene; the alpha methylene carboxylic acids, and their esters, nitriles and amides, such as acrylic acid methyl methacrylate, acrylonitrile, methacrylonitrile, methacrylamide; isobutylene; methyl vinyl ether; methyl vinyl ketone; vinylidene chloride. Such natural rubber and synthetic rubbers are conjugate diolefin polymer rubbers. Present day commercial synthetic rubbers of the above types are polymerized chloro-2-butadiene-1,3, known as neoprene or GR-M rubber, copolymers of butadiene-1,3 and styrene, known as Buna S or GR-S rubber, and copolymers of butadiene-1,3 and acrylonitrile, known as Buna N or GR-A rubber.

The following examples are illustrative of the present invention, all parts recited therein being by weight:

Example I

A GR-S latex was obtained which was made by the aqueous emulsion polymerization of 75 parts of butadiene-1,3 and 25 parts of styrene in the presence of 4.5 parts of a commercial sodium soap of a mixture of fatty acids having 16 to 18 carbon atoms in the molecule, viz. stearic, palmitic and oleic acids, and the usual small amounts of benzyl peroxide catalyst and dodecyl mercaptan regulator. The amount of water in the emulsion was such that the total solids of the latex was 29.14%. To 904 parts wet weight of the latex was added 95 parts of water, and 1 part of 10% ammonium. The pH of the latex was 8.9. To the 1000 parts of the thus treated latex was added 395 parts of 4% acetic acid half neutralized with dimethylamine to a pH of 4.75 (6% acetic acid based on the latex solids). The pH of the latex was reduced to 5 on addition of the acetic acid half neutralized with dimethylamine. 23 parts of 28% ammonia was then added to the thus treated latex to complete the neutralization of acetic acid and raise the pH of the latex to 9.6. The total solids of the thus treated latex was 19.55%. To various samples of the thus treated latex were added amounts of potassium laurate equivalent to .5 to 1.5% lauric acid based on the total solids of the latex. The samples were allowed to stand overnight together with a sample to which no potassium laurate had been added. No creaming took place in the sample to which no potassium laurate had been added. The percentage serum separation and the concentration of the serum and cream portions of the latices to which potassium laurate had been added are shown in the following table:

| Lauric Acid Based on Latex Solids | Serum | | Cream, Total Solids |
|---|---|---|---|
| | Per cent | Total Solids | |
| | | Per cent | Per cent |
| None | No creaming | 2.76 | 49.8 |
| 0.50 per cent | 64.2 | 2.01 | 54.2 |
| 0.75 per cent | 65.3 | 2.26 | 54.5 |
| 1.00 per cent | 65.8 | 3.19 | 54.6 |
| 1.25 per cent | 66.5 | 6.37 | 52.9 |
| 1.50 per cent | 71.1 | | |

The following table shows the effect of increasing the amount of acetic acid in the mixture of dimethylamine acetate and ammonium acetate. Only the maximum cream solids for each series of potassium laurate additions is recorded in each case.

| Acetic Acid Based on Latex Solids | Lauric Acid Based on Latex Solids | Total Solids of Latex before Creaming | Serum | | Cream, Total Solids |
|---|---|---|---|---|---|
| | | | Per Cent | Total Solids | |
| | Per cent | Per cent | | Per cent | Per cent |
| 6 per cent | 1.25 | 19.7 | 66.5 | 3.2 | 54.6 |
| 7 per cent | 0.75 | 18.9 | | 1.3 | 55.4 |
| 8 per cent | 0.60 | 17.7 | 71.5 | 2.9 | 57.2 |

Variation in the efficiency of various fatty acid soaps is shown in the following table. Different amounts of each soap were added to samples of the latex containing 8% acetic acid based on the latex solids neutralized with the ammonia and dimethylamine as in the bottom line of the table immediately above. The following data refers to maximum cream solids content of each series.

| Fatty Acid | No. of Carbon Atoms in the Molecule | Fatty Acid Based on Latex Solids | Total Solids of Latex before Creaming | Serum | | Cream, Total Solids |
|---|---|---|---|---|---|---|
| | | | | Per Cent | Total Solids | |
| | | Per cent | Per cent | | Per cent | Per cent |
| Caprylic | 8 | 3.00 | 15.9 | 80.4 | 8.1 | 52.9 |
| Pelargonic | 9 | 2.75 | 16.1 | 80.1 | 5.5 | 54.4 |
| Capric | 10 | 1.00 | 17.3 | 70.6 | 2.8 | 55.1 |
| Undecylenic | 11 | 0.71 | 16.3 | | 4.8 | 45.5 |
| Lauric | 12 | 0.60 | 17.7 | 71.5 | 2.9 | 57.2 |
| Myristic | 14 | 1.63 | 14.4 | | 0.9 | 54.5 |
| Palmitic | 16 | no creaming | | | | |
| Oleic | 18 | no creaming | | | | |
| Stearic | 18 | no creaming | | | | |

It may be seen from the above table that soaps of fatty acids containing more than 14 carbon atoms in the molecule are ineffective. As shown in Example II, soaps of abietic acid, however, are operative in the process of the present invention to produce dilatancy in the latex with creaming on standing.

Example II

A portion of the GR-S latex of Example I was diluted to 26% total solids and the pH was adjusted to 9 by addition of a small amount of ammonia. A 4% aqueous solution of acetic acid half neutralized with dimethylamine to a pH of 4.75, was then stirred into the latex, 8% acetic acid based on the weight of latex solids being added. The pH of the latex was thus reduced to 4.8. Ammonia was added to raise the pH to 9.5. Various amounts of dimethyl ammonium abietate as a 3% solution of abietic acid in excess of dimethylamine were added to various samples of 200 parts wet weight of the latex. After standing 4 days, cream and serum fractions were separated and analyzed as shown in the following table:

| 3% Abietic Acid in Dimethylamine | | Total Solids of Latex before Creaming | Serum | | Cream, Total Solids |
|---|---|---|---|---|---|
| Parts by Weight | Abietic Acid Based on Latex Solids | | Per Cent | Total Solids | |
| | Per cent | Per cent | | Per cent | Per cent |
| 11 | 0.9 | 17.3 | 65.9 | 1.41 | 47.2 |
| 12 | 1.0 | 17.2 | 59.8 | 2.78 | 41.3 |
| 13 | 1.1 | 17.1 | 69.8 | 0.94 | 53.7 |
| 14 | 1.2 | 17.1 | 69.5 | 1.34 | 53.4 |
| 16 | 1.3 | 16.9 | 56.3 | 0.99 | 38.2 |
| 18 | 1.5 | 16.8 | 54.4 | 0.96 | 37.2 |
| 20 | 1.7 | 16.7 | 64.2 | 3.19 | 38.8 |
| 23 | 1.9 | 16.5 | 61.7 | 1.11 | 44.5 |
| 25 | 2.1 | 16.3 | 66.1 | 0.86 | 48.5 |

Example III

To 1000 parts (wet weight) of the same 29.14% total solids GR-S latex as used in Example I was added 3 parts of 20% aqueous solution of a commercial surface active agent as a stabilizer (a sodium salt of a short chain alkyl naphthylene sulfonic acid, probably isopropyl naphthylene sodium sulfonate). This was equivalent to 0.2% based on the latex solids. To the latex was then added 933 parts of a 2½% aqueous solution of formic acid half neutralized with ammonia to a pH of 4. This was equivalent to 8% formic acid based on the latex solids. The pH of the latex was thus reduced to 4.6. The pH of the latex was then raised to about 9 by the addition of 38 parts of 28% ammonia. 20 parts of an aqueous potassium laurate soap solution of 30% lauric acid content was added to the latex. This was equivalent of 2% lauric acid on the latex solids. The total solids of the thus treated latex was 15.05%. Creaming overnight gave a cream of 25.09% solids. A sample to which 5% water based on the latex weight was added to give a 14.33% solids concentration creamed to 32.3% solids cream. A sample to which 7.5% water based on the latex weight was added to give a 14.00% solids concentration creamed to 38.4% solids cream. The dilution with water increased the viscosity of the latex due to the dilatant nature of the colloidal system, and gave higher solids content creams.

*Example IV*

To 1000 parts of a 28.4% total solids GR-S latex (copolymer of 75 parts butadiene and 25 parts styrene) was added 5.7 parts of a 20% aqueous solution of the short chain alkyl naphthylene sodium sulfonate stabilizer used in Example III. This amounted to 0.4% on the latex solids. To the thus treated latex was added 533 parts of a 4% aqueous solution of acetic acid half neutralized with dimethylamine to a pH of 4.75. The latex then had a pH of 5.1, and after 10 minutes, 24 parts of 28% ammonia was added bringing the pH up to 9.6 and giving a total solids latex of 20.3%. The latex was then divided into seven samples and treated with various amounts of ammonium laurate. After 3 days the cream and serum fractions were separated from each other. Analyses are shown in the following table:

| Lauric Acid Based on Latex Solids | Total Solids of Latex Before Creaming | Serum | | Cream, Total Solids |
|---|---|---|---|---|
| | | Per Cent | Total Solids | |
| | Per cent | | Per cent | Per cent |
| 0.55 per cent | 20.2 | 71.3 | 1.3 | 61.8 |
| .60 per cent | 20.2 | 72.0 | 1.3 | 64.1 |
| .65 per cent | 20.2 | 73.1 | 1.3 | 66.5 |
| .70 per cent | 20.2 | 74.5 | 1.2 | 67.6 |
| .75 per cent | 20.2 | 74.1 | 1.2 | 68.4 |
| .80 per cent | 20.2 | 74.6 | 1.5 | 69.6 |
| .85 per cent | 20.1 | 74.1 | 1.4 | 67.6 |

The viscosity and stability to rubbing of the cream of maximum content shown in the penultimate sample of the above table and having a solids content of about 70%, were equal to what would have been expected from 55% to 60% solids latex cream prepared by conventional creaming method. The 70% cream was fluid, whereas creams of 67 to 70% solids content produced by known concentration methods are thick non-flowing pastes.

*Example V*

To 1000 parts wet weight of a GR-S latex (copolymer of 75 parts butadiene and 25 parts styrene) having a 31.4% concentration of total solids, was added 4.7 parts of a 20% aqueous solution of the short chain alkyl naphthylene sodium sulfonate stabilizer as in Examples III and IV. This amounted to 0.3% on the latex solids. 315 parts of a 5% aqueous solution of acetic acid half neutralized with ammonia to a pH of 4.7 was then added. This amounted to 5% acetic acid on the total solids of the latex. The thus treated latex had a pH of 5.1, and after 10 minutes, 24 parts of 28% ammonia was added to raise the pH to over 9. Various amounts of ammonium laurate soap were added and the latices were allowed to cream for 3 days. Analyses are shown in the following table:

| Lauric Acid Based on Latex Solids | Total Solids of Latex Before Creaming | Serum | | Cream, Total Solids |
|---|---|---|---|---|
| | | Per Cent | Total Solids | |
| | Per cent | | Per cent | Per cent |
| 3.6 per cent | 22.6 | 37.3 | 1.9 | 30.6 |
| 3.8 per cent | 22.5 | 65.7 | 1.7 | 54.3 |
| 4.0 per cent | 22.4 | 67.0 | 1.6 | 57.8 |
| 4.2 per cent | 22.4 | 68.5 | 1.4 | 60.8 |
| 4.4 per cent | 22.3 | 46.4 | 1.2 | 42.6 |

*Example VI*

To 100 parts wet weight of natural rubber latex from Liberia that had been preserved with ammonia and concentrated by centrifuging to 61% solids, was added 135 parts of water to 26% solids concentration. To the latex was added 0.6 part of a 20% aqueous solution of the short chain alkyl naphthylene sodium sulfonate stabilizer as used in Examples III to V. This amounted to 0.2% of the stabilizer based on the latex solids. 107 parts of a 4% aqueous solution of acetic acid in ammonia (pH of 7.3) was added. This was the equivalent of 7% acetic acid based on the latex solids. The total solids of the thus treated latex was 19.48%. Various amounts of a 3% aqueous solution of lauric acid made alkaline with potassium hydroxide to a pH of 8.5, were added to portions of the latex treated above. A sample containing the amount of soap equivalent to 1% lauric acid based on the solids content of the latex separated into 63.8 parts of a serum of 6.25% total solids and 36.2 parts of a cream of 40.9% total solids.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A process for treating a conjugate diolefin polymer rubber latex which comprises incorporating in such a rubber latex at least one salt of weak acid of the group consisting of carbonic, formic, acetic, propionic and butyric acids and a base of the group consisting of ammonia and amines, the equivalent weak acid content being 1 to 10% by weight based on the latex solids, and at least one alkali soap of soap-forming acid of the group consisting of fatty acids having 8 to 14 carbon atoms in the molecule and abietic acid and mixtures thereof, the equivalent soap-forming acid content thereof being 0.25 to 5% by weight based on the latex solids the thus treated latex having a pH of at least 8, allowing the thus treated latex to stand until it separates into a cream fraction rich in rubbery material and a serum fraction poor in rubbery material, and separating said fractions from each other.

2. A process for treating a conjugate diolefin polymer rubber latex which comprises incorporating in such a rubber latex at least one ammonium salt of weak acid of the group consisting of carbonic, formic, acetic, propionic and butyric acids, the equivalent weak acid content being 1 to 10% by weight based on the latex solids, and at least one alkali salt of soap-forming acids of the group consisting of fatty acids having 8 to 14 carbon atoms in the molecule and abietic acid and mixtures thereof, the equivalent soap-forming acid content thereof being 0.25 to 5% by weight based on the latex solids, the thus treated latex having a pH of at least 8, allowing the thus treated latex to stand until it separates into a cream fraction rich in rubbery material and a serum fraction poor in rubbery material, and separating said fractions from each other.

3. A process for treating a conjugate diolefin polymer rubber latex which comprises incorporating in such a rubber latex at least one salt of weak acid of the group consisting of carbonic, formic, acetic, propionic and butyric acids and volatile amine having a boiling point below 160° C., the equivalent weak acid content being 1 to 10% by weight based on the latex solids, and at least one alkali salt of soap-forming acids of the group consisting of fatty acids having 8 to 14 carbon atoms in the molecule and abietic acid and mixtures thereof, the equivalent soap-forming acid content thereof being 0.25 to 5% by weight based on the latex solids, the thus treated latex having a pH of at least 8, allowing the thus treated latex to stand until it separates into a cream fraction rich in rubbery material and a serum fraction poor in rubbery material, and separating said fractions from each other.

4. A process for treating a conjugate diolefin polymer rubber latex which comprises incorporating in such a rubber latex at least one ammonium salt of weak acid of the group consisting of carbonic, formic, acetic, propionic and butyric acids, the equivalent weak acid content being 1 to 10% by weight based on the latex solids, and at least one alkali salt of a fatty acid having 8 to 14 carbon atoms in the molecule, the equivalent fatty acid content thereof being 0.25 to 5% by weight based on the latex solids, the thus treated latex having a pH of at least 8, allowing the thus treated latex to stand until it separates into a cream fraction rich in rubbery material and a serum fraction poor in rubbery material, and separating said fractions from each other.

5. A process for treating a conjugate diolefin polymer rubber latex which comprises incorporating in such a rubber latex at least one salt of weak acid of the group consisting of carbonic, formic, acetic, propionic and butyric acids and volatile amine having a boiling point below 160° C., the equivalent weak acid content being 1 to 10% by weight based on the latex solids, and at least one alkali salt of a fatty acid having 8 to 14 carbon atoms in the molecule, the equivalent fatty acid content thereof being 0.25 to 5% by weight based on the latex solids, the thus treated latex having a pH of at least 8, allowing the thus treated latex to stand until it separates into a cream fraction rich in rubbery material and a serum fraction poor in rubbery material, and separating said fractions from each other.

6. A process for treating a conjugate diolefin polymer rubber latex which comprises incorporating in such a rubber latex at least one salt of weak acid of the group consisting of carbonic, formic, acetic, propionic and butyric acids and a base of the group consisting of ammonia and amines, the equivalent weak acid content being 1 to 10% by weight based on the latex solids, and at least one ammonium soap of soap-forming acid of the group consisting of fatty acids having 8 to 14 carbon atoms in the molecule and abietic acid and mixtures thereof, the equivalent soap-forming acid content thereof being 0.25 to 5% by weight based on the latex solids, the thus treated latex having a pH of at least 8, allowing the thus treated latex to stand until it separates into a cream fraction rich in rubbery material and a serum fraction poor in rubbery material, and separating said fractions from each other.

7. A process for treating a conjugate diolefin polymer rubber latex which comprises incorporating in such a rubber latex at least one salt of weak acid of the group consisting of carbonic, formic, acetic, propionic and butyric acids and a base of the group consisting of ammonia and amines, the equivalent weak acid content being 1 to 10% by weight based on the latex solids, and at least one amine soap of soap-forming acid of the group consisting of fatty acids having 8 to 14 carbon atoms in the molecule and abietic acid and mixtures thereof, the equivalent soap-forming acid content thereof being 0.25 to 5% by weight based on the latex solids, the thus treated latex having a pH of at least 8, allowing the thus treated latex to stand until it separates into a cream fraction rich in rubbery material and a serum fraction poor in rubbery material, and separating said fractions from each other.

8. A process for treating a conjugate diolefin polymer rubber latex which comprises incorporating in such a rubber latex at least one salt of weak acid of the group consisting of carbonic, formic, acetic, propionic and butyric acids and a base of the group consisting of ammonia and amines, the equivalent weak acid content being 1 to 10% by weight based on the latex solids, and at least one ammonium soap of a fatty acid having 8 to 14 carbon atoms in the molecule, the equivalent fatty acid content thereof being 0.25 to 5% by weight based on the latex solids, the thus treated latex having a pH of at least 8, allowing the thus treated latex to stand until it separates into a cream fraction rich in rubbery material and a serum fraction poor in rubbery material, and separating said fractions from each other.

9. A process for treating a conjugate diolefin polymer rubber latex which comprises incorporating in such a rubber latex at least one salt of weak acid of the group consisting of carbonic, formic, acetic, propionic and butyric acids and a base of the group consisting of ammonia and amines, the equivalent weak acid content being 1 to 10% by weight based on the latex solids, and at least one amine soap of a fatty acid having 8 to 14 carbon atoms in the molecule, the equivalent fatty acid content thereof being 0.25 to 5% by weight based on the latex solids, the thus treated latex having a pH of at least 8, allowing the thus treated latex to stand until it separates into a cream fraction rich in rubbery material and a serum fraction poor in rubbery material, and separating said fractions from each other.

JOHN S. RUMBOLD.

REFERENCES CITED

The following references are of record in the file of this patent:

UNITED STATES PATENTS

| Number | Name | Date |
| --- | --- | --- |
| 1,978,247 | Clarke et al. | Oct. 23, 1934 |
| 1,983,703 | McGavack | Dec. 11, 1934 |
| 2,357,861 | Wilson | Sept. 12, 1944 |
| 2,393,261 | Peaker | Jan. 22, 1946 |